United States Patent [19]

Roesler et al.

[11] Patent Number: 5,859,118
[45] Date of Patent: Jan. 12, 1999

[54] AQUEOUS DISPERSIONS OF POLYURETHANE/UREAS CONTAINING ALKOXYSILANE GROUPS AND COLLOIDAL SILICAS

[75] Inventors: Richard R. Roesler, Wexford, Pa.; Lutz Schmalstieg, Koln, Germany; Lyuba K. Gindin, Pittsburgh, Pa.

[73] Assignees: Bayer Corporation, Pittsburgh, Pa.; Bayer Aktiengesellschaft, Leverkusen, Germany

[21] Appl. No.: 992,550

[22] Filed: Dec. 17, 1997

[51] Int. Cl.[6] .............................. C08J 3/00; C08K 3/20; C08L 75/00; C08L 83/00
[52] U.S. Cl. .................... 524/493; 524/492; 524/588; 524/591; 524/839; 524/840
[58] Field of Search .................. 524/588, 591, 524/839, 840, 492, 493

[56] References Cited

U.S. PATENT DOCUMENTS

| | | | |
|---|---|---|---|
| 5,041,494 | 8/1991 | Franke et al. | 524/588 |
| 5,354,808 | 10/1994 | Onwumere et al. | 524/837 |
| 5,554,686 | 9/1996 | Frisch, Jr. et al. | 524/588 |
| 5,635,544 | 6/1997 | Tamura et al. | 522/79 |

*Primary Examiner*—Patrick D. Niland
*Attorney, Agent, or Firm*—Joseph C. Gil; Thomas W. Roy

[57] ABSTRACT

The present invention relates to aqueous dispersions which contain

A) 30 to 90% by weight, based on the solids content of A) and B), of polyurethane/ureas containing 0.5 to 6% by weight, based on the weight of the polyurethane/ureas, of alkoxysilane groups (calculated as Si, MW 28) and B) 10 to 70% by weight, based on the solids content of A) and B), of colloidal silica.

The present invention relates to coatings prepared from these aqueous dispersions.

17 Claims, No Drawings

AQUEOUS DISPERSIONS OF POLYURETHANE/UREAS CONTAINING ALKOXYSILANE GROUPS AND COLLOIDAL SILICAS

FIELD OF THE INVENTION

The present invention relates to aqueous dispersions of polyurethane/ureas containing alkoxysilane groups and also colloidal silica and to their use for the production of coatings which have improved solvent resistance and hardness.

BACKGROUND OF THE INVENTION

The production of linear or cross-linked aqueous polyurethane-urea dispersions is known. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings.

It has been disclosed in U.S. Pat. Nos. 5,041,494, 5,354,808 and 5,554,856, and also in copending applications, U.S. Ser. Nos. 08/992,163 and 08/992,551, that the properties of these dispersions can be improved by the incorporation of alkoxysilane groups into the polyurethane-ureas. However, regardless of the property level which may be obtained for coatings prepared from these polyurethane-urea dispersions, there is always a further need to increase certain properties, in particular solvent resistance.

Accordingly, It is an object of the present invention to provide aqueous polyurethane/urea dispersions which can be used to prepare coatings which possess improved solvent resistance and still retain the other valuable properties of aqueous polyurethane dispersions.

This object may be achieved in accordance with the present invention by blending aqueous dispersions of polyurethane/ureas containing alkoxysilane groups with colloidal silica.

SUMMARY OF THE INVENTION

The present invention relates to aqueous dispersions which contain
A) 30 to 90% by weight, based on the solids content of A) and B), of polyurethane/ureas containing 0.5 to 6% by weight, based on the weight of the polyurethane/ureas, of alkoxysilane groups (calculated as Si, MW 28) and
B) 10 to 70% by weight, based on the solids content of A) and B), of colloidal silica.

The present invention relates to coatings prepared from these aqueous dispersions.

DETAILED DESCRIPTION OF THE INVENTION

In accordance with the present invention the term "polyurethane/urea" means polymers containing urethane and/or urea groups.

In order to improve the solvent resistance and also the hardness of coatings prepared from the aqueous polyurethane dispersions containing alkoxysilane groups, colloidal silica is added to the dispersions in accordance with the present invention. The improvement is believed to be due to the fact that colloidal silica contains polysilicon dioxide with Si—OH radicals on the surface of each particle. These Si—OH radicals can react with silanes so that a chemical bond exists between the inorganic modified organic matrix and the silica particle. It is believed that this imparts a character to the film, not unlike an elastomer, where hard domains are surrounded by a soft continuous phase.

Suitable examples of colloidal silica include those having various particle sizes and surface treatments. The colloidal silica preferably has an average particle size of 1 to 500 nanometers, more preferably 1 to 100 nanometers and most preferably 1 to 50 nanometers. The surface treatments include acid washing or alkali washing with bases such as sodium or ammonium hydroxide. Alkali washing is preferred for polyurethane/ureas containing anionic groups and acid washing is preferred for polyurethane/ureas containing cationic groups. Examples of colloidal silica are those available from DuPont under the Ludox tradename.

The aqueous dispersions according to the invention contain polyurethane-ureas A) and colloidal silica B) in amounts of 90:10 to 30:70, preferably 80:20 to 40:60, based on the solids contents of A) and B).

Suitable aqueous polyurethane/urea dispersions for use in accordance with the present invention have been described, e.g., in U.S. Pat. Nos. 5,041,494, 5,354,808 and 5,554,686, and also in copending applications, U.S. Ser. Nos. 08/992,163 and 08/992,551, all of which are herein incorporated by reference. Processes and starting materials for preparing the aqueous dispersions are disclosed in these references. Suitable starting materials for preparing the polyurethane-ureas include polyisocyanates (preferably diisocyanates), a high molecular weight component (preferably a polyol), low molecular weight chain extenders containing hydroxy or amine groups, compounds containing ionic or nonionic groups and compounds containing alkoxysilane groups.

The polyurethane/ureas may be dispersed in water by either the inverse process or the direct process. In the direct process water is added to the polymer to initially form a water-in-oil emulsion, which after passing through a viscosity maximum, is converted into an oil-in-water emulsion. In the inverse process the polymer is added to water, which avoids the need to pass through the viscosity maximum.

Suitable compounds containing alkoxysilane groups and amino groups, which may be used to prepare the polyurethane-ureas, include those corresponding to formula I

wherein
X represents identical or different organic groups which are inert to isocyanate groups below 100° C., provided that at least one of these groups is an alkoxy or acyloxy group, preferably alkyl or alkoxy groups having 1 to 4 carbon atoms and more preferably alkoxy groups,
$R_1$ represents hydrogen or an organic group which is inert to isocyanate groups at a temperature of 100° C. or less, preferably an alkyl, cycloalkyl or aromatic group having 1 to 12, preferably 1 to 8 carbon atoms, or a group corresponding to the formula

and
n is an integer from 1 to 8, preferably 2 to 4 and more preferably 3.

Especially preferred compounds of formula I are those wherein X represents methoxy, ethoxy groups or propoxy groups, more preferably methoxy or ethoxy groups and most preferably methoxy groups, and n is 3.

A special group of compounds containing alkoxysilane groups are those which also contain aspartate groups, such as those corresponding to formula III

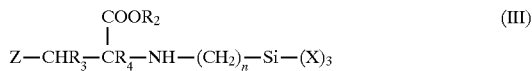

wherein

X and n are as defined above,

Z represents $COOR_5$ or an aromatic ring, preferably $COOR_5$, $R_2$ and $R_5$ are identical or different and represent organic groups which are inert to isocyanate groups at a temperature of 100° C. or less, preferably alkyl groups having 1 to 9 carbon atoms, more preferably methyl, ethyl or butyl groups and $R_3$ and $R_4$ are identical or different and represent hydrogen or organic groups which are inert to isocyanate groups at a temperature of 100° C. or less, preferably hydrogen.

The compounds of formula III are known and disclosed in U.S. Pat. No. 5,364,955, which is herein incorporated by reference. They may be prepared by reacting aminoalkyl alkoxysilanes corresponding to the formula III with maleic, fumaric or cinnamic acid esters corresponding to formula IV

wherein X, $R_2$, $R_3$ and $R_4$ are as previously defined.

The compounds containing alkoxysilane and aspartate groups of formula III are preferably based on the reaction product of 3-amino-propyl-trimethoxysilane or 3-aminopropyl-triethoxysilane with the dimethyl, diethyl and dibutyl esters of maleic acid.

The compounds containing alkoxysilane groups and amino groups are present in an amount sufficient to incorporate 0.5 to 6% by weight, preferably 0.5 to 4% and more preferably 0.5 to 3%, based on the weight of the polyurethane/ureas, of alkoxysilane groups (calculated as Si, MW 28).

Suitable starting materials for preparing the polyurethane/ureas are known and have been disclosed in the references previously incorporated by reference. These starting materials include organic diisocyanates, preferably (cyclo) aliphatic diisocyanates, more preferably bis-(4-isocyanatocyclohexyl)-methane, 1,6-hexamethylene diisocyanate and isophorone diisocyanate, and most preferably bis-(4-isocyanatocyclohexyl)-methane and isophorone diisocyanate.

Also suitable are high molecular weight compounds containing at least two isocyanate-reactive groups, preferably hydroxy groups, and having molecular weights of 400 to 6,000, preferably 800 to 3,000, and low molecular weight compounds (chain extenders) having molecular weights below 400. The molecular weights are number average molecular weights ($M_n$) and are determined by end group analysis (OH number). Preferred high molecular weight compounds are the known polyester polyols, polyether polyols and polyhydroxy polycarbonates, more preferably the polyester polyols. Examples of these compounds are also disclosed in U.S. Pat. No. 4,701,480, herein incorporated by reference.

While the presence of these high molecular weight polyols is optional, they are preferably used in amount of at least 5%, more preferably at least 10% by weight, based on the weight of the polyurethane/urea. The maximum amount of these polyols is preferably 85%, more preferably 75% by weight, based on the weight of the polyurethane/urea.

The low molecular weight isocyanate-reactive compounds having an average molecular weight of up to 400 are selected from the known polyhydric alcohols, preferably dihydric alcohols, and the known low molecular polyamines, preferably diamines. Examples of polyhydric alcohols are those previously described for the preparation of the polyester and polyether polyols in the references incorporated by reference.

Preferred polyhydric alcohols, preferably dihydric alcohols include ethylene glycol, propylene glycol-(1,2) and -(1,3), butylene glycol-(1,4) and -(1,3), hexanediol-(1,6), octanediol-(1,8), neopentyl glycol, glycerine and trimethylolpropane.

Examples of suitable polyamines include those disclosed in U.S. Pat. No. 4,408,008, herein incorporated by reference. Also suitable are the aldimines disclosed in U.S. Pat. No. 5,569,706 and the aspartates disclosed in U.S. Pat. No. 5,126,170, both of which are herein incorporated by reference.

Preferred polyamines include 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

In addition to the above-mentioned components which are preferably difunctional in the isocyanate polyaddition reaction, monofunctional and even small portions of trifunctional and higher functional components known from polyurethane chemistry, such as trimethylolpropane, may be used in special cases in which slight branching of the NCO prepolymer or polyurethane/urea is desired.

In order to enable the polyurethane/urea to be stably dispersed in an aqueous medium, either the dispersions are blended with external emulsifiers or ionic or potential ionic groups and/or lateral or terminal, hydrophilic ethylene oxide units are chemically incorporated into the polyurethane/urea. The ionic or potential ionic groups may be either anionic or cationic, preferably anionic. Examples of anionic groups include carboxylate and sulfonate groups, while examples of cationic groups include ammonium and sulfonium groups.

The ionic groups are incorporated in an amount sufficient to provide an ionic group content of 0 to 200 milliequivalents per 100 g of polyurethane/urea. When the ionic or potential ionic groups are incorporated, they are preferably incorporated in an amount sufficient to provide an ionic group content of at least 10, preferably at least 20 milliequivalents per 100 g of polyurethane/urea. The upper limit for the content of ionic groups is preferably 180, more preferably 100 milliequivalents per 100 g of polyurethane/urea.

The content of hydrophilic ethylene oxide units may be up to about 10%, preferably up to about 8%, more preferably about 1 to 6% and most preferably about 2 to 6%, by weight, based on the weight of the polyurethane/urea. In addition, up to about 75% of the allowable, chemically incorporated, hydrophilic ethylene oxide units may be replaced by the known nonionic, external emulsifiers.

The ionic groups are formed by neutralizing the corresponding potential ionic groups either prior to, during or after formation of the polyurethane/ureas. When the potential ionic groups are neutralized prior to their incorporation into the polyurethane/ureas, the ionic groups are incorporated directly. When neutralization is performed subsequent to forming the polyurethane/ureas, potential ionic groups are incorporated.

Suitable compounds for incorporating the carboxylate, sulfonate and quaternary nitrogen groups are described in U.S. Pat. Nos 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. patents. Within the context of this invention, the term "neutralizing agents" is meant to embrace all types of agents which are useful for converting potential ionic groups to ionic groups.

Suitable compounds for incorporating the lateral or terminal, hydrophilic ethylene oxide units are known and disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example, propylene oxide.

The prepolymers may be prepared in the presence of solvent, preferably a solvent that is substantially nonreactive in the context of the isocyanate-polyaddition reaction. Examples of suitable solvents include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

In addition to the preceding organic solvents, it is also possible to use silicon-containing reactive diluents as solvents during the production of the prepolymers and for the resulting coating compositions. Examples of these reactive diluents include tetramethoxy silane, tetraethoxy silane, methyl triethoxy silane, methyl trimethoxy silane, ethyl triethoxy silane, octyl triethoxy silane and dimethyl diethoxy silane.

The use of these reactive diluents provides two important benefits. First, the coating compositions contains less environmentally regulated organic solvent. Second, the reactive diluent is also a co-reactant for the polyurethane/urea dispersion and provides a composition with increased inorganic character. Coatings prepared from these compositions have different performance properties when compared to coatings prepared from compositions that do not contain these reactive diluents. Suitable neutralizing or quaternizing agents for converting the potential anionic groups to anionic groups either before, during or after their incorporation into the polyurethane/ureas, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine and N-methyl-diethanol amine. Suitable neutralizing agents for converting potential cationic groups to cationic groups are disclosed in U.S. Pat. Nos. 3,479,310 and 3,419,533, which are incorporated by reference.

A sufficient amount of the potential ionic groups must be neutralized so that when combined with the hydrophilic ethylene oxide units and optional external emulsifiers, the polyurethane/urea final product will be a stable dispersion. Generally, at least about 75%, preferably at least about 90%, of the potential ionic groups are neutralized to the corresponding ionic groups.

The aqueous dispersions containing polyurethane/urea particles and colloidal silica have a solids content of up to 60% by weight, preferably 15 to 60% by weight and more preferably 30 to 45% by weight. However, it is always possible to dilute the dispersions to any minimum solids content desired. The average particle size of the polyurethane-ureas is generally below 1000 nanometers, preferably 1 to 500 nanometers and more preferably 1 to 300 nanometers. The small particle size enhances the stability of the dispersed particles and also leads to the production of films with high surface gloss.

The dispersions may be blended with other dispersions or with other known additives such as fillers, plasticizers, pigments, carbon black, silica sols and the known levelling agents, wetting agents, antifoaming agents and stabilizers.

The aqueous polyurethane/urea dispersions are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

Drying of the products obtained by various application techniques may be carried out either at room temperature or at elevated temperature. When the products are cured, water evaporates and the silane groups react with one another to form Si—O—Si linkages, which provide additional crosslinking. For this reason the molecular weight of the products does not have to as high as prior art products to attain similar performance levels. This means that the viscosity of the polyurethane/urea is lower, which means that higher solids products can be obtained or less solvent is necessary.

In the following examples all parts and percentages are by weight unless otherwise specified.

EXAMPLES

The following ingredients were used in the examples:
Polyol 1

A polyester diol prepared from 1,6-hexanediol, neopentyl glycol and adipic acid, number average molecular weight—1700, molar ratio of glycols 65:35.
Monool 1

A monohydroxy polyether prepared from n-butanol, ethylene oxide, and propylene oxide (in a molar ratio ethylene oxide to propylene oxide of 83:17), equivalent weight 2150.
Silane Aspartate 1

8.27 equiv of 3-aminopropyltrimethoxysilane were added to a 5 liter flask fitted with agitator, thermocouple, nitrogen inlet and addition funnel with condenser. 8.27 equiv of dialkyl maleate were added dropwise through the addition funnel over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete.

Preparation of Silane Polyurethane Dispersion (PUD) 1

To a three neck flanged resin flask fitted with stirrer, nitrogen inlet, thermocouple and condenser were added 113 g (0.133 eq) of polyol 1 and 2.51 g (0.0012 eq) of monool 1. This mixture was melted at 80° C. To the molten mixture was added 6.94 g (0.133 eq) of neopentyl glycol and 8.0 g (0.119 eq) of dimethylol propionic acid. The temperature of the reaction mixture was raised to 120° C. to melt and homogenize the mixture. The reaction mixture was cooled to 90° C. and 70 g (0.627 eq) of isophorone diisocyanate (IPDI) were added in one portion. The reaction was held at 100° C. for two hours when the theoretical NCO of 5.05% was obtained. 48 g of N-methyl pyrolidinone (NMP) were added and, after the temperature was reduced to 45° C., 4.84 g (0.48 eq; 80% of the acid) of triethyl amine were added to neutralize the acid. The neutralized mixture was stirred at 45° C. for ten minutes. The temperature was raised to 60° C. 88.11 g (0.240 eq) of silane aspartate 1 was added. The reaction mixture was held at 60° C. for one hour. 292 g of the prepolymer was added under high shear to 263 g of 60° C. water contained in a resin flask. The high shear was maintained for 30 minutes to yield a dispersion that was stable for at least 4 weeks. The dispersion had a resin solids content of 45% and contained 7.4% NMP.

Coatings Prepared from Silane PUD 1

Coated panels were prepared by adding 0.02 parts of dimethyl tin diacetate per 100 parts of silane functional PUD 1. The formulated resin was cast as an 8 mil wet film which resulted in a ~3.5 mil dry film. The coating was allowed to dry at room temperature for thirty minutes and then placed in a 110° C. oven for one hour. The film was clear, glossy and flexible, passed 100 MEK double rubs and demonstrated good hydrolytic stability after overnight immersion in water at room temperature.

Coatings Prepared from Silane PUD 1 Containing Colloidal Silica

The preparation of coated panels from PUD 1 was repeated except that the formulated PUD (45% solids) was blended with a colloidal silica dispersion (Ludox AM-30 colloidal silica, 30% solids in water). Ratios of PUD 1 to colloidal silica were varied in increments from 9:1, 8:1, . . . 1:9 wt:wt, based on resin solids. The formulations were cast as 8 mil wet films which resulted in ~3.5 mil dry films. The coatings were allowed to dry at room temperature for thirty minutes and then placed in a 110° C. oven for one hour. Films which had 9:1 or 8:2 ratios of PUD 1 to colloidal silica were glossy and clear; those at 7:3 were glossy, but very slightly hazy; and those with higher ratios of colloidal silica were very hazy. Films at 2:8 and 1:9 ratios of PUD 1 to colloidal silica were brittle and did not form a film. The good films all passed 100 MEK double rubs and demonstrated good hydrolytic stability after being immersed overnight in ambient temperature water.

Preparation of Silane PUD 2

A silane PUD was prepared following the procedure used to prepare silane PUD 1 except that only 10 g of NMP was used, dimethyl ethanol amine (4.26 g, 0.48 eq) was used as the neutralizing amine, and 201 g of 60° C. water was added to the prepolymer to form a stable 40% solids dispersion which contained 2% NMP.

Coatings Prepared from Silane PUD 2

Coated panels were prepared by adding 0.35 parts of triethylene diamine catalyst (available as DABCO 33LV from Air Products) per 100 parts of silane functional PUD 2. The resin was cast as a 5 mil wet film which resulted in a ~2 mil dry film. The coating was allowed to dry at room temperature for thirty minutes and then placed in a 110° C. oven for one hour. Another film was allowed to cure at ambient conditions for two weeks. Both films were clear, glossy and flexible, passed 25 MEK double rubs and demonstrated good hydrolytic stability after overnight immersion in water at room temperature. Additional properties are set forth in Table 1.

Coatings Prepared from Silane PUD 2 Containing Colloidal Silica

The preparation of coated panels PUD 2 was repeated except that the formulated PUD (40% solids) was blended with the colloidal silica dispersion described above. Ratios of PUD 2 to colloidal silica were varied in increments from 9:1, 8:1, . . . 4:6 wt:wt, based on resin solids. The formulations were cast as 5 mil wet films which resulted in ~2 mil dry films. The coatings were allowed to dry at room temperature for thirty minutes and then placed in a 110° C. oven for one hour. Another set of coatings were allowed to cure at ambient conditions. Films which had 9:1 or 6:4 ratios of PUD 2 to colloidal silica were glossy and clear; those at 5:5 were glossy, but very slightly hazy; and those with higher ratios of colloidal silica were very hazy. Films at 4:6 and 3:7 ratios of PUD 2 to colloidal silica were brittle and did not form a film. The good films demonstrated good hydrolytic stability after being immersed overnight in ambient temperature water. Additional properties are set forth in Table 1.

TABLE 1

| PUD 2 weight % | Colloidal Silica weight % | Gloss 60° | Gloss 20° | DOI | Pencil hardness | MEK Double Rubs Passed |
| --- | --- | --- | --- | --- | --- | --- |
| 100 | 0 | 95 | 66 | 13 | 2H | 25 |
| 90 | 10 | 86 | 42 | 15 | 2H | 33 |
| 80 | 20 | 88 | 51 | 16 | 2H | 50 |
| 70 | 30 | 87 | 46 | 17 | 2H | >100 |
| 60 | 40 | 75 | 37 | 16 | 3H | >100 |
| 50 | 50 | 83 | 43 | 14 | 3H | >100 |

Gloss was determined in accordance with ASTM D-523-85.

DOI was determined in accordance with GM 9101P—test for evaluating paint film distinctness of image.

Pencil hardness was determined in accordance with ASTM D-3363-75.

The number of MEK double rubs was determined by wetting a cheesecloth with methyl ethyl ketone and then rubbing each panel. A double rub consists of one back and forth rub against the coated panel.

Preparation of Silane PUD 3

A silane PUD was prepared following the procedure used to prepare silane PUD 1. The procedure for PUD 2 was repeated except that 10 g of tetraethoxysilane was substituted for the 10 g of NMP to form a stable 40% solids dispersion containing no added solvent.

Coatings Prepared from Silane PUD 3

Coated panels were prepared by adding 0.35 parts of triethylene diamine catalyst per 100 parts of silane functional PUD 3. The resin was cast as a 5 mil wet film which resulted in a ~2 mil dry film. The coating was allowed to dry at room temperature for thirty minutes and then placed in a 110° C. oven for one hour. The film was clear, glossy and flexible, passed 18 MEK double tubs and demonstrated good hydrolytic stability after overnight immersion in water at room temperature. Additional properties are set forth in Table 2.

Coatings Prepared from Silane PUD 3 Containing Colloidal Silica

The preparation of coated panels from PUD 3 was repeated except that the formulated PUD (40% solids) was blended with the colloidal silica dispersion described above. Ratios of PUD 3 to colloidal silica were varied in increments from 9:1, 8:1, . . . 4:6 wt:wt, based on resin solids. The formulations were cast as 5 mil wet films which resulted in ~2 mil dry films. The coatings were allowed to dry at room temperature for thirty minutes and then placed in a 110° C. oven for one hour. Another set of coatings were allowed to cure at ambient conditions. Films which had 9:1 or 6:4 ratios of PUD 3 to colloidal silica were glossy and clear; those at 5:5 were glossy, but very slightly hazy; and those with higher ratios of colloidal silica were very hazy. The good films demonstrated good hydrolytic stability after being immersed overnight in ambient temperature water. Additional properties are set forth in Table 2.

TABLE 2

| PUD 2 weight % | Colloidal Silica weight % | Gloss 60° | Gloss 20° | DOI | Pencil Hardness | MEK Double Rubs Passed |
|---|---|---|---|---|---|---|
| 100 | 0 | 82 | 44 | 12 | 2H | 18 |
| 90 | 10 | 82 | 42 | 10 | 2H | 38 |
| 80 | 20 | 75 | 36 | 9 | 2H | >100 |
| 70 | 30 | 87 | 64 | 14 | H | >100 |
| 60 | 40 | 71 | 30 | 8 | 2H | >100 |
| 50 | 50 | 70 | 29 | 6 | 2H | >100 |
| 40 | 60 | 65 | 27 | 8 | 2H | >100 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous dispersion which contains
    A) 30 to 90% by weight, based on the solids content of A) and B), of polyurethane/ureas containing 0.5 to 6% by weight, based on the weight of the polyurethane/ureas, of alkoxysilane groups (calculated as Si, MW 28) and
    B) 10 to 70% by weight, based on the solids content of A) and B), of colloidal silica.

2. The dispersion of claim 1 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

3. The dispersion of claim 2 wherein at least about 80% of said anionic groups are carboxylate groups neutralized with tertiary amines.

4. The dispersion of claim 1 wherein said polyurethane/ureas contain 10 to 120 milliequivalents per 100 grams of polyurethane/ureas of chemically incorporated cationic groups and up to about 10% by weight, based on the weight of said polyurethane/ureas, of lateral and/or terminal hydrophilic chains containing ethylene oxide units.

5. The dispersion of claim 1 wherein component A) is present in an amount of 40 to 80% by weight and component B) is present in an amount of 20 to 60% by weight, wherein these percentages are based on the solids content of A) and B).

6. The dispersion of claim 2 wherein component A) is present in an amount of 40 to 80% by weight and component B) is present in an amount of 20 to 60% by weight, wherein these percentages are based on the solids content of A) and B).

7. The dispersion of claim 3 wherein component A) is present in an amount of 40 to 80% by weight and component B) is present in an amount of 20 to 60% by weight, wherein these percentages are based on the solids content of A) and B).

8. The dispersion of claim 4 wherein component A) is present in an amount of 40 to 80% by weight and component B) is present in an amount of 20 to 60% by weight, wherein these percentages are based on the solids content of A) and B).

9. An aqueous dispersion which contains
    A) 30 to 90% by weight, based on the solids content of A) and B), of polyurethane/ureas containing 0.5 to 6% by weight, based on the weight of the polyurethane/ureas, of alkoxysilane groups (calculated as Si, MW 28), which have been incorporated by the reaction of isocyanate groups with a compound containing at least one alkoxysilane groups and at least one aspartate group, and
    B) 10 to 70% by weight, based on the solids content of A) and B), of colloidal silica.

10. The dispersion of claim 9 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

11. The dispersion of claim 10 wherein at least about 80% of said anionic groups are carboxylate groups neutralized with tertiary amines.

12. The dispersion of claim 9 wherein said polyurethane/ureas contain 10 to 120 milliequivalents per 100 grams of polyurethane/ureas of chemically incorporated cationic groups and up to about 10% by weight, based on the weight of said polyurethane/ureas, of lateral and/or terminal hydrophilic chains containing ethylene oxide units.

13. The dispersion of claim 9 wherein component A) is present in an amount of 40 to 80% by weight and component B) is present in an amount of 20 to 60% by weight, wherein these percentages are based on the solids content of A) and B).

14. The dispersion of claim 10 wherein component A) is present in an amount of 40 to 80% by weight and component B) is present in an amount of 20 to 60% by weight, wherein these percentages are based on the solids content of A) and B).

15. The dispersion of claim 11 wherein component A) is present in an amount of 40 to 80% by weight and component B) is present in an amount of 20 to 60% by weight, wherein these percentages are based on the solids content of A) and B).

16. The dispersion of claim 12 wherein component A) is present in an amount of 40 to 80% by weight and component B) is present in an amount of 20 to 60% by weight, wherein these percentages are based on the solids content of A) and B).

17. A coating prepared from the aqueous polyurethane/urea dispersion of claim 1.

* * * * *